United States Patent
Nachev et al.

(10) Patent No.: US 8,358,092 B2
(45) Date of Patent: Jan. 22, 2013

(54) METHOD FOR CONTROL OF SYNCHRONOUS ELECTRICAL MOTORS

(76) Inventors: Radek Georgiev Nachev, Varna (BG); Blagovest Georgiev Nachev, Varna (BG)

( * ) Notice: Subject to any disclaimer, the term of this patent is extended or adjusted under 35 U.S.C. 154(b) by 462 days.

(21) Appl. No.: 12/676,362

(22) PCT Filed: Oct. 29, 2008

(86) PCT No.: PCT/BG2008/000020
§ 371 (c)(1),
(2), (4) Date: Mar. 4, 2010

(87) PCT Pub. No.: WO2009/062270
PCT Pub. Date: May 22, 2009

(65) Prior Publication Data
US 2010/0201297 A1   Aug. 12, 2010

(30) Foreign Application Priority Data
Nov. 15, 2007  (BG) .......................................... 109997

(51) Int. Cl.
*H02P 6/18* (2006.01)

(52) U.S. Cl. ......... 318/400.32; 318/400.01; 318/400.34; 318/700

(58) Field of Classification Search ............. 318/400.01, 318/400.32, 400.34, 700
See application file for complete search history.

(56) References Cited

U.S. PATENT DOCUMENTS

| | | | |
|---|---|---|---|
| 2006/0214611 A1* | 9/2006 | Wang et al. | 318/254 |
| 2008/0224639 A1* | 9/2008 | Balsiger | 318/254.1 |
| 2010/0001673 A1* | 1/2010 | Cardoletti et al. | 318/400.34 |

* cited by examiner

*Primary Examiner* — Kawing Chan

(57) ABSTRACT

Method for control of synchronous electrical motors that enables determining the instantaneous motor load angle and rotor speed without using rotor position sensors. The method is realized with solving the set of differential equations that govern the currents in the stator windings of the motor for the time intervals between each two consecutive crossings of the currents in the windings of their set values and deriving relationships between the induced in the windings back-electromotive force voltages and the parameters of the Pulse Width Modulation. The parameters of the Pulse Width Modulation are measured and stored in a memory and based on the derived relationships the values of the back-electromotive force voltages are calculated continuously in time. From the values of the back-electromotive force voltages the motor load angle and rotor speed are calculated and used as feedback signals for the closed-loop control of the motor.

1 Claim, 4 Drawing Sheets

METHOD FOR CONTROL OF SYNCHRONOUS ELECTRICAL MOTORS

BACKGROUND OF THE INVENTION

The present invention describes a method for control of synchronous electrical motors with application to Stepper Motors and Brushless Direct Current Motors for which the currents in their stator windings are regulated with Pulse Width Modulation. The invention enables continuous in time sensorless determination of the load angle and the angular speed of the motor and consequently it enables sensorless closed-loop motor control.

A method for stepper motor control is known where the back-electromotive force voltages induced in the stator windings of the motor are measured only in the time intervals when there is no current flowing through them. During every full electrical period of the currents in the stator windings of a two-phase bipolar stepper motor there are four time intervals when there is no current in one of the two windings. The voltages on the stator windings' terminals during these time intervals are measured and the measured values are compared with a given set value. If these voltages are greater than the set value it is assumed that the rotor of the motor is moving, if these voltages are smaller than the set value it is assumed that the rotor is stalled. This method relies on measuring the back-electromotive force voltages induced by the moving rotor in the stator windings where these voltages can be measured only in the intervals of time when there is no current through the windings.

One of the shortcomings of the above method is that the monitoring of the rotor rotation can be done only in the time intervals when there is no current through one of the stator windings. When there is current flowing through the windings it is not possible to monitor the rotor rotation. Also from the measured values of the back-electromotive force voltages it is not possible that the load angle of the motor is determined, which does not allow controlling the motor speed depending on the motor loading.

A method for control of brushless direct current motors is also known where the currents in the stator windings of the motor are controlled depending on the rotor position, which in turn is determined with Hall sensors. Depending on the position of the rotor magnetic field, the Hall sensors generate logical signals zero or one at their outputs. Using these logical signals the rotor position is determined and the currents in the stator windings are controlled in order to maintain a certain load angle of the motor.

A shortcoming of this method is the necessity of using Hall sensors or other means for rotor position monitoring which leads to higher complexity and higher price.

BRIEF SUMMARY OF THE INVENTION

The goal of the present invention is to create a method for control of synchronous electrical motors which allows determining the motor load angle and speed of rotation continuously in time without using sensors for the rotor position.

According to the present invention this goal is achieved with the method for control of synchronous electrical motors where the shape of currents in the stator windings of the motor is monitored. The resistances, the inductances and the mutual inductances between the windings of the motor are determined and stored in memory. The supply voltage of the motor is measured and its value is also stored in memory. The durations of the time intervals when the stator windings are connected to the supply voltage and when they are short-circuited between each two consecutive reachings of the currents in the windings to their set values are measured and stored in memory. The total durations of the time intervals between the two consecutive reachings of the currents to their set values are calculated froth the measured and stored durations of the intervals when the stator windings are connected to the supply voltage and when they are short-circuited and these total durations are stored in memory. The set values of the currents in the time interval between the two consecutive reachings of the currents to their set values are also stored in memory. From the stored values and based on determined relationships the values of the induced in the windings back-electromotive force voltages $u_{bemf1}$ and $u_{bemf2}$ are calculated. From the calculated values of the back-electromotive force voltages $u_{bemf1}$ and $u_{bemf2}$, the current values of the motor load angle $\theta$ and the angular rotor speed $\omega$ are calculated. A given set value of the load angle is set and the control of the motor is realized where if the current value of the load angle is greater than the set one, either the motor operating currents are increased, or the motor speed is decreased, or both actions are carried out together. If the current value of the load angle is smaller than the set one, either the motor operating currents are decreased or the motor speed is increased or both actions are carried out together. If the current values of the back-electromotive force voltages $u_{bemf1}$ and $u_{bemf2}$ become zero or close to zero, motor stall condition is detected.

The advantages of the present method for control of synchronous electrical motors are that the load angle of the motor and the motor speed are calculated continuously at every moment of time. There is no need that additional sensors for the rotor position and speed are used. The method realizes closed-loop sensorless control of the motor where the calculated load angle and rotor speed serve as feedback signals to close the loop of the closed-loop control.

BRIEF DESCRIPTION OF THE SEVERAL VIEWS OF THE DRAWINGS

The present invention is described with more details with an exemplary device for control of synchronous electrical motors using Pulse Width Modulation, which device realizes the method and is given on the following figures where:

On FIG. 1 a principal electrical diagram of the device that controls the currents through the stator windings of an electrical motor using Pulse Width Modulation is given;

Figure 2:
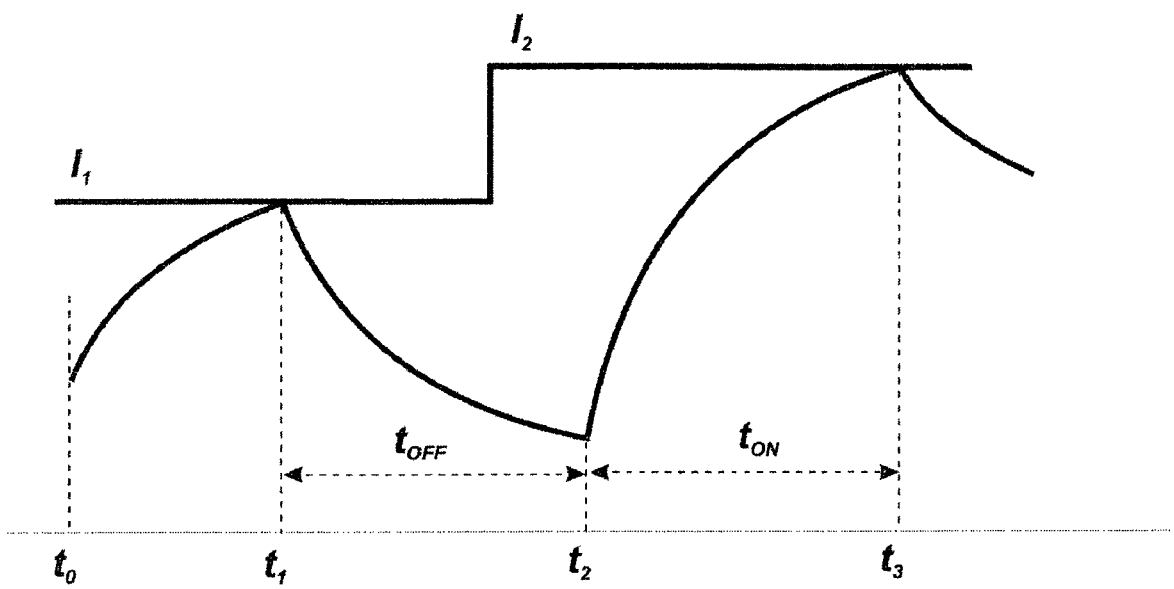
Figure 3:
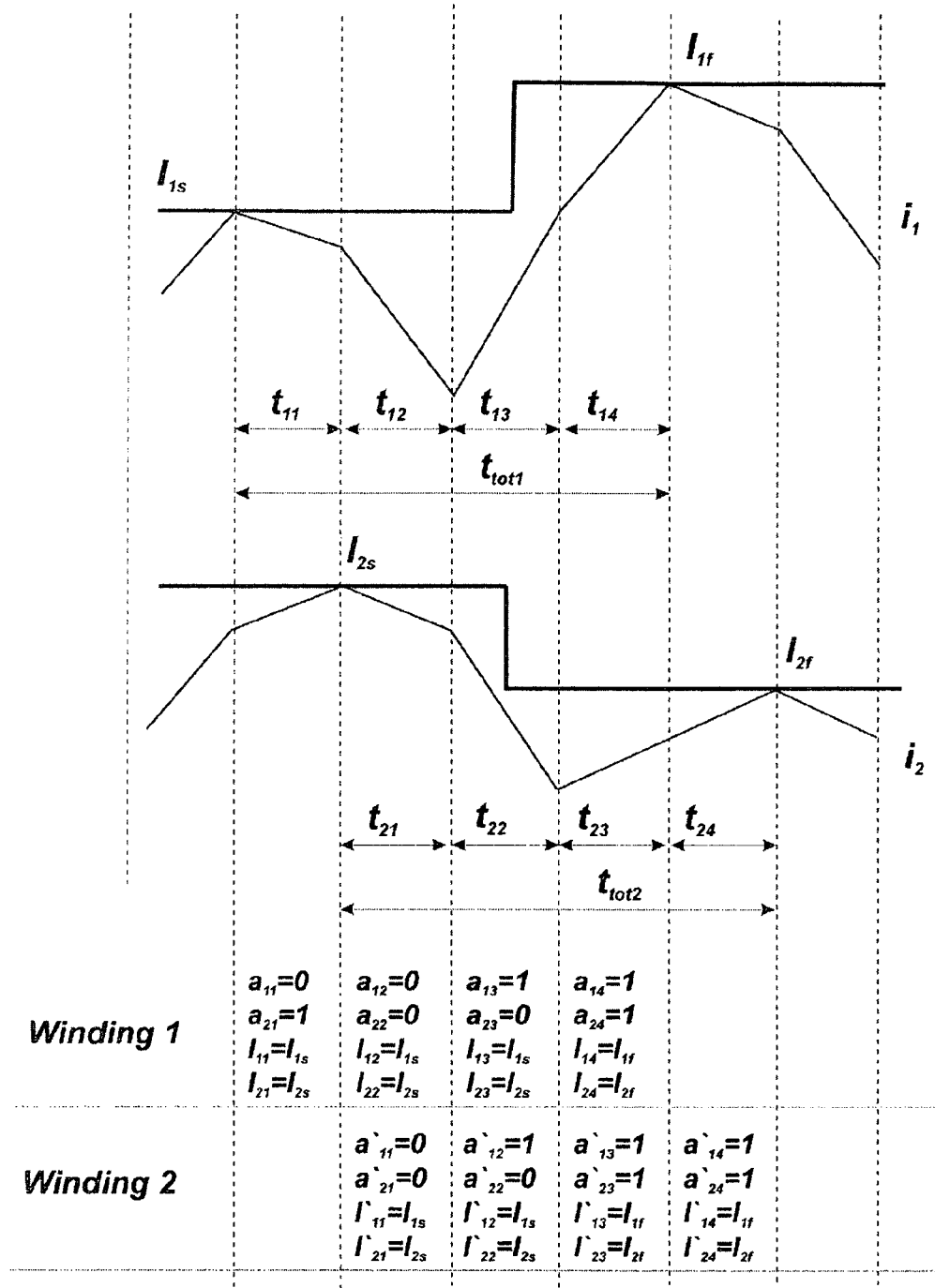
Figure 4:
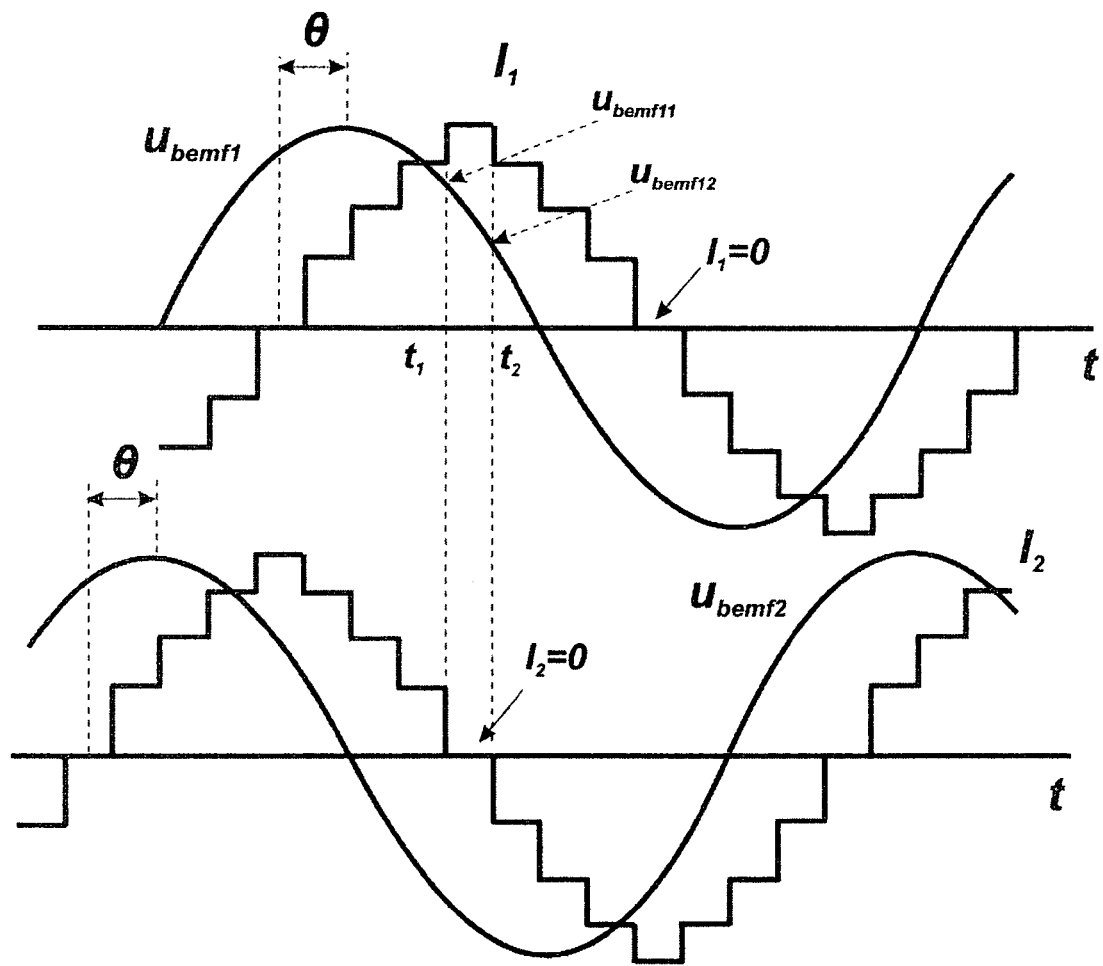

On FIG. 2 the waveform of the current through one of the stator windings of the electrical motor is given;

On FIG. 3 the waveforms of the currents through both stator windings of the electrical motor are given, together with the set values of these currents and the durations of the time intervals of increasing and decreasing of these currents, all needed for calculation of the induced back-electromotive force voltages;

On FIG. 4 the waveforms of the currents in the stator windings, the induced back-electromotive force voltages in the stator windings and the load angle of a stepper motor are given.

DETAILED DESCRIPTION OF THE INVENTION

One of the principles of control of stepper and brushless direct current motors that has found most widespread application is regulation of the currents in the stator windings of the motor Pulse Width Modulation.

Current regulation with Pulse Width Modulation is realized through switching on and off of certain switching devices (usually bipolar or field-effect transistors) that connect the stator windings of the motor to a constant voltage supply source or short-circuit them. When a given winding is connected to the supply source the current through it increases, and when the same winding is short-circuited the current through it decreases. In this way, with constantly changing the winding's connection, the current through it is regulated around a given set value. The set values of the currents through the stator windings are chosen in such a way in time that a rotating magnetic field is generated in the stator. This rotating magnetic field in turn drags with itself the rotor and forces it to rotation.

Figure 1:
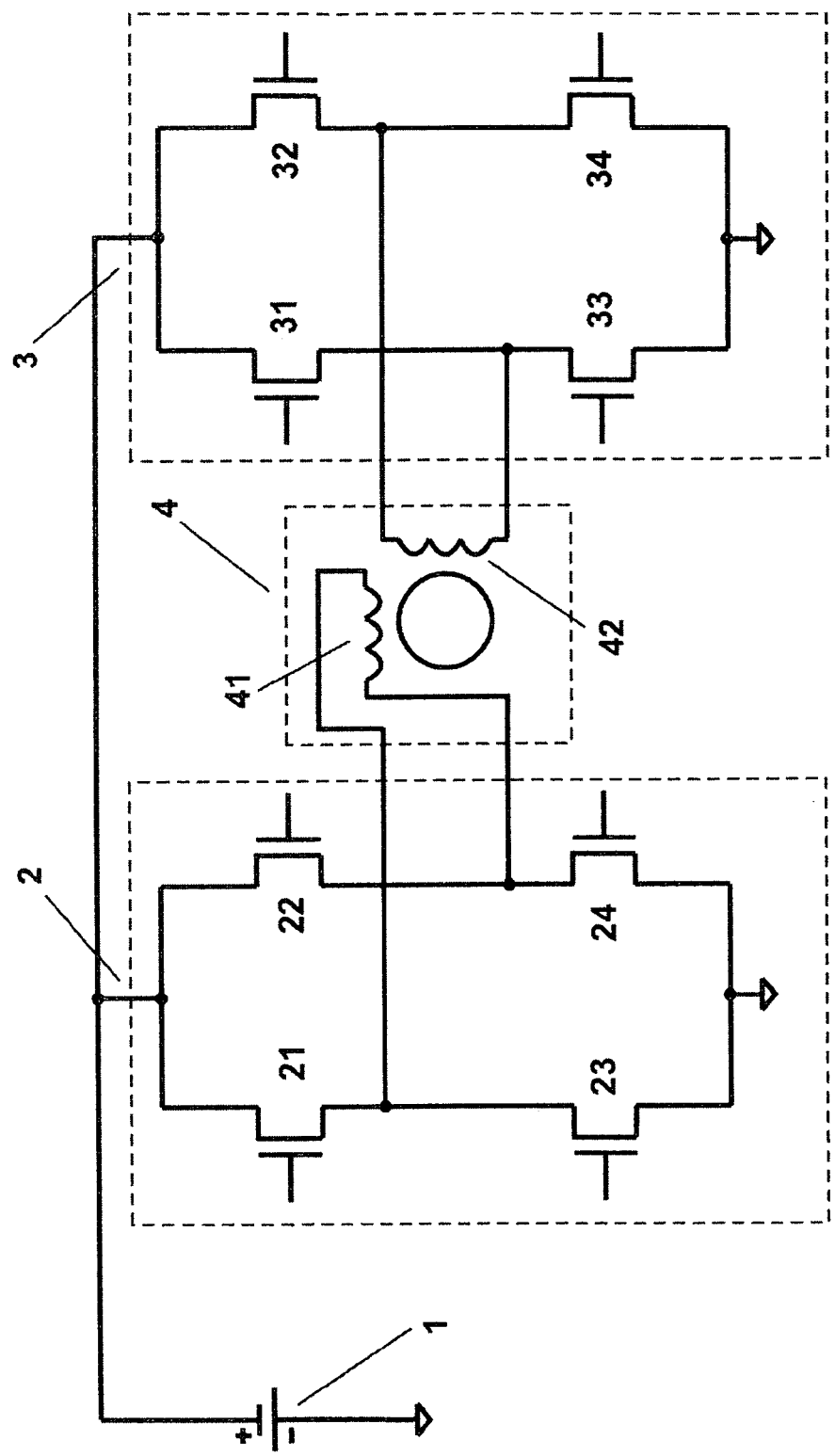

An example of a motor driver that uses this principle for a two phase stepper or brushless direct current motor is given on FIG. 1. The driver includes a supply source 1 and two H-bridges 2 and 3. The H-bridges 2 and 3 consist of four switching devices each, respectively 21, 22, 23, 24 and 31, 32, 33, 34. The motor 4 is shown with its two stator windings 41 and 42, each of them connected to one of the diagonals of the H-bridges 2 and 3. The supply source 1 is connected to the other diagonal of the H-bridges 2 and 3.

The H-bridges allow that the currents through the two stator windings of the motor are regulated with Pulse Width Modulation. When for example the switching devices 21 and 24 of the first H-bridge are switched on, the respective winding 41 is connected between the positive and the negative terminal of the supply source 1 and the current through this winding increases. When the switching devices 23 and 24 of the same H-bridge are switched on, the winding 41 is short-circuited and the current through it decreases. In this way the current through the winding 41 of the motor is regulated around the chosen set value. The same way the current through the other winding 42 of the motor is regulated also. Thus currents with certain values are driven through the stator windings of the motor, these currents in turn generate magnetic field in the stator. The set values of the currents are chosen in such a way in time that they generate a rotating magnetic field. It is well known that in order to create rotating magnetic field the set values of the two currents should follow sinusoidal waveforms that have to be phase-shifted between each other with 90 degrees.

On FIG. 2 the waveform of one of the currents in the stator windings is shown. At time $t_0$ the switching devices of the respective H-bridge connect the winding to the supply source. The current through the winding starts to increase. At time $t_i$ the current through the winding has reached its set value $I_1$ and the switching devices short-circuit the winding. The current starts to decrease until time $t_2$ when the switching devices again connect the winding to the supply source. The current starts to increase again until time $t_3$ when it reaches again its set value. On the figure a change in the set value is shown, it changes from $I_1$ to $I_2$ and after $t_2$ the current continues to increase until the new set point $I_2$ is reached. The time difference $t_{PWM}=t_2-t_0$ between $t_0$ and $t_2$ is called period of the Pulse Width Modulation and is usually a constant value. The time difference $t_{OFF}=t_2-t_1$ is called switch-off time and the time difference $t_{ON}=t_3-t_2$ is called switch-on time of the Pulse Width Modulation.

The mathematical relationships of the currents in the stator windings of a two-phase synchronous electrical motor can be given with the following set of differential equations:

$$L\frac{di_1}{dt} + Ri_1 + M\frac{di_2}{dt} = a_1E - u_{bemf1} \quad (1)$$

-continued $$L\frac{di_2}{dt} + Ri_2 + M\frac{di_1}{dt} = a_2E - u_{bemf2}$$

where L and R are the inductance and resistance of the stator windings, M is the mutual inductance between the two windings, E is the supply source voltage, and $i_2$ are the two currents in the windings, $u_{bemf1}$ and $u_{bemf2}$ are the back-electromotive force voltages induced in the two windings and $a_1$ and $a_2$ are coefficients equal respectively to 1 or 0 depending on whether the windings are connected to the supply source or are short-circuited.

The present invention consists of a method for calculating the values of the back-electromotive forge voltages $u_{bemf1}$ and $u_{bemf2}$, provided that we know the mathematical relationships (1) of the currents in the windings, the time durations $t_{OFF}$ and $t_{ON}$ of the Pulse Width Modulation, the set values of the currents $I_1$ and $I_2$, the supply source voltage E, and the parameters of the motor—the resistance R, the inductance L and the mutual inductance M of the windings.

The procedure implementing the method starts with the moment in time when the current through a winding, for example $i_1$ has reached its set value—this is time $t_1$ from FIG. 2. At this moment the value of the current $i_1$ is known and it is equal to $I_1$. The set of differential equations (1) describing the currents in the windings is solved for the time interval between $t_1$ and $t_2$. The common integral for $i_1$ is derived from the set of differential equations (1) and the particular solution $i_1(t)$ is determined from the initial condition $i_1(0)=I_1$. After that the value of the current $i_1(t_{OFF})$ for $t=t_{OFF}$ is determined. The set of differential equations (1) is once more solved for $i_1$ this time in the interval between $t_2$ and $t_3$. The common integral is again derived and the particular solution $i_1(t)$ is this time determined from the new initial condition $i_1(0)=i_1(t_{OFF})$. Now if we find the value of $i_1$ for $t=t_{ON}$ we come to an equation $i_1(t_{ON})=I_2$ where all variables except the back-electromotive force voltages $u_{bemf1}$ and $u_{bemf2}$ are known. In the same way (1) is solved for the other current $i_2$ and we come to two independent equations from which the values of the two back-electromotive force voltages $u_{bemf1}$ and $u_{bemf2}$ can be determined. While solving for $u_{bemf1}$ and $u_{bemf2}$ we have made the assumption that the back-electromotive force voltages are constant for the time intervals between $t_1$ and $t_3$ which is valid because the period of the back-electromotive force voltages is much longer than the time interval between $t_1$ and $t_3$.

A practical application of the method is presented below.

For the cases when the influence of the mutual inductance M between the windings can be neglected, the set of differential equations (1) transforms to two separate differential equations. For example for the current $i_1$ in the time interval between $t_1$ and $t_2$ the following equation is valid:

$$L\frac{di_1}{dt} + Ri_1 = -u_{bemf1} \quad (2)$$

The coefficient $a_1$ for this time interval is equal to 0 because the winding is short-circuited. After solving of (2) for the interval between $t_1$ and $t_2$, knowing that the value of $i_1$ at time $t_1$ is equal to $I_1$ we find that $i_1$ at time $t_2$ is equal to:

$$i_1(t_2) = \left(I_1 + \frac{u_{bemf1}}{R}\right)e^{-t_{OFF}/\tau} - \frac{u_{bemf1}}{R} \quad (3)$$

where τ=L/R is the time constant of the electrical circuit.

For the time interval between $t_2$ and $t_3$ the following differential equation is valid:

$$L\frac{di_1}{dt} + Ri_1 = E - u_{bemf1} \qquad (4)$$

where the coefficient $a_2$ for this interval is equal to 1 because the winding is connected to the supply source. After solving of (4) for the interval between $t_2$ and $t_3$, knowing that $i_1$ at time $t_2$ is equal to (3) we find that $i_1$ at time $t_3$ is equal to:

$$i_1(t_3) = \left(\left(I_1 + \frac{u_{bemf1}}{R}\right)e^{-t_{OFF}/\tau} - \frac{E}{R}\right)e^{-t_{ON}/\tau} + \frac{E - u_{bemf1}}{R} \qquad (5)$$

If we take in mind that $i_1(t_3)=I_2$ from (5) we get one equation with one unknown variable–$u_{bemf1}$. After solving this equation for the back-electromotive force voltage $u_{bemf2}$ we obtain:

$$u_{bemf1} = \frac{E(1 - e^{-t_{ON1}/\tau}) + RI_{11}e^{-(t_{ON1}+t_{OFF1})/\tau} - RI_{12}}{1 - e^{-(t_{ON1}+t_{OFF1})/\tau}} \qquad (6)$$

where $I_{11}$ and $I_{12}$ are the set values for the current in the first winding at the moments of time $t_1$ and $t_3$, and $t_{ON1}$ and $t_{OFF1}$ are the switch-on and the switch-off times of the current in the first winding (FIG. 2).

In the same way the value of the back-electromotive force voltage $u_{bemf2}$ in the second winding can be derived:

$$u_{bemf2} = \frac{E(1 - e^{-t_{ON2}/\tau}) + RI_{21}e^{-(t_{ON2}+t_{OFF2})/\tau} - RI_{22}}{1 - e^{-(t_{ON2}+t_{OFF2})/\tau}} \qquad (7)$$

where $I_{21}$ and $I_{22}$ are the set values for the current in the second winding and $t_{ON2}$ and $t_{OFF2}$ are the switch-on and the switch-off times of the current in the second winding.

From the theory of the two-phase synchronous motors it is known that the back-electromotive force voltages in the windings are given with the following relationships:

$$u_{bemf1} = U_m \cos\beta = k\omega \cos\beta$$

$$u_{bemf2} = U_m \sin\beta = k\omega \sin\beta \qquad (8)$$

where $U_m$ is the amplitude of the back-electromotive force voltages, ω is the angular speed of the rotor, κ is a coefficient that depends on the motor and can be determined from the datasheet parameters of the motor and β is the angular position of the rotor in respect to the chosen zero position. If we know the values of the back-electromotive force voltages $u_{bemf1}$ and $u_{bemf2}$ from the set of equations (8) we can determine the angular speed ω and the angular position β of the rotor. From the other hand the angular position α of the vector of the stator magnetic field is also known at any moment of time. The difference between the angular position α of the stator magnetic field vector and the rotor angular position β is the load angle θ of the motor:

$$\theta = \alpha - \beta \qquad (9)$$

If the load angle θ or the angular speed ω of the rotor are known, it is possible to realize a closed-loop control of the motor where the load angle or the angular speed serve as feedback signal of the closed-loop control.

A closed-loop control of the motor based on the load angle will be realized by setting a set value for the load angle and if the current load angle becomes bigger than the set one, the motor currents have to be increased or the motor speed has to be decreased or both actions can be done simultaneously. If the current load angle becomes smaller than the set one, the motor currents have to be decreased or the motor speed has to be increased or both actions can be done simultaneously.

Following the method described above it is possible to realize devices for sensorless motor control where it is not necessary to have additional sensors for the rotor position or speed.

In order that the calculations are simplified, the relationships (6) and (7) can be expanded in Taylor series. If we limit the expansion to first order terms only, we have:

$$u_{bemf1} = E\frac{t_{ON1}}{t_{ON1} + t_{OFF1}} - RI_{11} - \frac{L(I_{12} - I_{11})}{t_{ON1} + t_{OFF1}} \qquad (10)$$

$$u_{bemf2} = E\frac{t_{ON2}}{t_{ON2} + t_{OFF2}} - RI_{21} - \frac{L(I_{22} - I_{21})}{t_{ON2} + t_{OFF2}}$$

These simplified relationships can be used where it is possible to make a compromise with the accuracy of $u_{bemf1}$ and $u_{bemf2}$ calculation in order to gain speed in the microprocessor device that controls the motor. The expansion in Taylor series can be done up to second and higher-order terms depending on the constraints for accuracy and speed of calculations.

The above derivations were made with the assumption that the mutual inductance M between the windings can be neglected. In cases when the mutual inductance can not be neglected the above method can still be applied where for the values of the back-electromotive farce voltages $u_{bemf1}$ and $u_{bemf2}$ their average values from several consecutive calculations are taken. Since the influence of the mutual inductance in two consecutive time intervals where the current changes from increasing to decreasing is approximately equal in magnitude and opposite in sign, if we average enough values of $u_{bemf1}$ and $u_{bemf2}$, the influence of the mutual inductance will be reduced. The more values we average the better will be the accuracy of calculation. From the other hand the averaging will lead to filtration of fast changes of $u_{bemf1}$ and $u_{bemf2}$, therefore the number of the values averaged has to be chosen as a trade-off between the necessary accuracy and the sensitivity to fast changes in the particular application.

An approach for calculating $u_{bemf1}$ and $u_{bemf2}$ in cases when the mutual inductance M can not be neglected and the averaging does not give satisfactory results is given bellow. The set of differential equations (1) can not be separated into two independent equations. In general it represents a first order set of linear differential equations. For this type of sets of differential equations there exists a methodology for exact analytical solving. When this methodology is applied and in the same way as the above description the differential set is solved for the time intervals between every two consecutive moments of time when the currents reach their set values, it is possible to derive two independent equations from which the values of the back-electromotive force voltages $u_{bemf1}$ and $u_{bemf2}$ can be calculated. After finding $u_{bemf1}$ and $u_{bemf2}$ from (8) and (9) the load angle and the angular speed of the motor can be determined. Because the solving of the differential set is too long it is not presented in this description.

In this description a simplified solution to the differential set (1) when the mutual inductance M can not be neglected will be presented. In this solution some assumptions for simplification have been done but they give the necessary accuracy of $u_{bemf1}$ and $u_{bemf2}$ calculation. If we write down (1) in the following way:

$$L\frac{di_1}{dt} + M\frac{di_2}{dt} = a_1 E - u_{bemf1} - Ri_1 \quad (11)$$

$$L\frac{di_2}{dt} + M\frac{di_1}{dt} = a_2 E - u_{bemf2} - Ri_2$$

and assume that the currents $i_1$ and $i_2$ at the right hand side of the equations are equal at any moment of time to their set values respectively $I_{1i}$ and $I_{2i}$ (i=1, 2, ...) (FIG. 3), then (11) becomes an algebraic set of equations from which the time derivatives of the two currents can be determined:

$$\frac{di_1}{dt} = \frac{E(La_1 - Ma_2) + u_{bemf2}M - u_{bemf1}L + R(MI_2 - LI_1)}{L^2 - M^2} \quad (12)$$

$$\frac{di_2}{dt} = \frac{E(La_2 - Ma_1) + u_{bemf1}M - u_{bemf2}L + R(MI_1 - LI_2)}{L^2 - M^2}$$

The assumption that the currents are equal to their set values is valid because the Pulse Width Modulation is regulating the currents close to their set values. If we now substitute the derivatives in (1) but only in the terms that describe the influence of the mutual inductance we come to the following set:

$$L\frac{di_1}{dt} + Ri_1 == a_1 E - u_{bemf1} - \quad (13)$$

$$\frac{M}{L^2 - M^2}(E(La_2 - Ma_1) + u_{bemf1}M - u_{bemf2}L + R(MI_1 - LI_2))$$

$$L\frac{di_2}{dt} + Ri_2 == a_2 E - u_{bemf2} -$$

$$\frac{M}{L^2 - M^2}(E(La_1 - Ma_2) + u_{bemf2}M - u_{bemf1}L + R(MI_2 - LI_1))$$

This way (1) is transformed again into two independent linear differential equations and the above described method for $u_{bemf1}$ and $u_{bemf2}$ calculation can be applied again. After applying this method for $u_{bemf1}$ and $u_{bemf2}$ we find:

$$u_{bemf1} = \frac{(A + pB)}{(1 - p^2)} \quad (14)$$

$$u_{bemf2} = \frac{(B + pA)}{(1 - p^2)}$$

where A and B are given with the following formulas:

$$A = \frac{(I_{1f} - I_{1s}e^{-t_{tot1}/\tau})R(1 - p^2) + S_{1n}}{e^{-t_{tot1}/\tau} - 1} \quad (15)$$

$$B = \frac{(I_{2f} - I_{2s}e^{-t_{tot2}/\tau})R(1 - p^2) + S_{2m}}{e^{-t_{tot2}/\tau} - 1}$$

$S_{1n}$ and $S_{2m}$ are given with the following recursive formulas:

$$S_{10}=0$$

$$S_{1i}=S_{1i-1}e^{-t1i/\tau}+(Ea_{1i}-pEa_{2i}-p^2RI_{1i}+pRI_{2i})(e^{-t1i/\tau}-1)$$

i=1 ... n and $$S_{20}=0$$

$$S_{2j}=S_{2j-1}e^{-t2j/\tau}+(Ea'_{2j}-pEa'_{1j}-p^2RI'_{2j}+pRI'_{1j})(e^{-t2j/\tau}-1)$$

j=1 ... m where p=M/L, $I_{1f}$ and $I_{2f}$ (FIG. 3) are the set values of the two currents at the end of the time interval of solving the equations, $I_{1s}$ and $I_{2s}$ are the set values of the two currents at the beginning of the time interval of solving the equations, $t_{tot1}$ and $t_{tot2}$ are the total durations of the time intervals between the two consecutive moments when the currents reach their set values, $t_{1i}$ and $t2j$ are the durations of the consecutive time intervals during which the windings are connected to the supply source or are short-circuited, $a_{1i}$, a'$1j$ and $a_{2i}$, a'$2j$ are the coefficients in the respective time intervals that signify whether the respective winding is connected to the supply source or is short-circuited (in general $a_{1i}$ and a'$1j$ also $a_{2i}$ and a'$2j$ may not be equal because they may represent different time intervals), $I_{1i}$, I'$1j$ and $I_{2i}$, I'$2j$ are the set values of the currents in the respective time intervals of calculation (in general $I_{1i}$ and I'$1j$ also $I_{2i}$ and I'$2j$ may not be equal because they may represent different time intervals), n and m are the total number of intervals that $t_{tot1}$ and $t_{tot2}$ consist of.

This way we can calculate $u_{bemf1}$ and $u_{bemf2}$ in cases when the effect of the mutual inductance M between the windings can not be neglected. After finding $u_{bemf1}$ and $u_{bemf2}$, according to (8) and (9) we can determine the load angle and the angular speed of the motor and the control of the motor can be realized.

Another approach for eliminating the effect of the mutual inductance M while solving (1) is to chose time intervals when one of the currents $i_1$ or $i_2$ is zero. For most of the algorithms for stepper motor control such time intervals exist.

On FIG. 4 the waveforms of the set values for the two stator currents in a two-phase stepper motor are shown. It is shown that for every full period of the currents there exist two time intervals when the set value of the current is zero. In these time intervals the differential set (1) will be simplified to only one differential equation that can be solved with the described method for the respective back-electromotive force voltage $u_{bemf1}$ or $u_{bemf2}$ (see formulas (6) and (7)). On FIG. 4 the waveforms of the back-electromotive force voltages $u_{bemf1}$ and $u_{bemf2}$ are shown. The load angle θ that determines the phase shift between the currents and the back-electromotive force voltages is also shown on the same figure.

Let's assume that from (6) we have found the back-electromotive force voltage in the first winding $u_{bemf1}$ at a moment of time when the current $i_2$ in the second winding is zero. Because at this moment we have only one of the equations (8), it is not possible only from this equation to find the two independent variables—the angular position β and the angular speed of the rotor ω. However, if we assume that the rotor rotates synchronously with the stator magnetic field, then one of the variables will be known—the rotor angular speed ω will be equal to the angular speed of rotation of the stator magnetic field $ω_{st}$, which is known. From the datasheet parameters of the motor or with measurements it is also possible to determine the value of the coefficient k in (8). This way we come to only one unknown variable in the equation—the angular position β of the rotor. Then this angle is found with the following formula:

$$\cos\beta = \frac{u_{bemf1}}{U_m} = \frac{u_{bemf1}}{k\omega_{st}} \quad (18)$$

where $\omega_{st}$ is the angular speed of the stator magnetic field.

If we have found the value of the back-electromotive force voltage in the second winding $u_{bemf2}$, in the same way the angular position $\beta$ of the rotor is found with the following formula:

$$\sin\beta = \frac{u_{bemf2}}{U_m} = \frac{u_{bemf2}}{k\omega_{st}} \quad (19)$$

From the angular position of the rotor $\beta$, using (9), we can find the load angle $\theta$.

If the back-electromotive force voltage in one of the windings, calculated when the current in the other winding is zero, becomes equal or close to zero, it will mean that the rotor has stopped rotating. This way stall detection of the motor can be realized.

Another way of calculating the rotor angular position $\beta$ and the rotor angular speed $\omega$ is to write down the first equation from (8) for two different moments in time, for example $t_1$ and $t_2$ (FIG. 4) in the time interval when the current in the second winding is zero. If we assume that the speed of the rotor is one and the same for both moments, we come to the following set of equations:

$$u_{bemf11} = k\omega \cos\beta$$

$$u_{bemf12} = k\omega \cos(\beta + \omega\Delta t) \quad (20)$$

where $\Delta t = t_2 - t_1$ is the time interval between $t_1$ and $t_2$. It the time interval $\Delta t$ is mush shorter than the period of $u_{bemf1}$, the assumption that the speed of the rotor does not change between $t_1$ and $t_2$ is valid. The set (20) has two independent equations with two independent variables and can be solved for the rotor angular position $\beta$ and the rotor angular speed $\omega$.

Respectively for the back-electromotive force voltage in the second winding we will have the following set:

$$u_{bemf21} = k\omega \sin\beta$$

$$u_{bemf22} = k\omega \sin(\beta + \omega\Delta t) \quad (21)$$

From (20), (21) and (9) the rotor angular position $\beta$, the rotor angular speed $\omega$ and the motor load angle $\theta$ can be found. After these variables are found the motor can be controlled with a closed-loop control as described above.

The invention claimed is:

1. Method for control of synchronous electrical motor, characterized with this, that resistance R, inductances L, the time constants $\tau = L/R$ and mutual inductance M between windings of the motor are determined and stored in a memory; a value of a supply voltage E of the motor is measured and stored in the memory; durations of time intervals when the windings are connected to the supply voltage and when they are short-circuited, between each two consecutive crossings of the currents in the windings of their set values, are measured and stored in the memory; the set values of the currents in the windings during all the said time intervals are also stored in the memory; from all the stored values and based on the following formulas the values of the induced in the motor windings back-electromotive force voltages $U_{bemf1}$ and $U_{bemf2}$ are calculated:

$$u_{bemf1} = \frac{(A + pB)}{(1 - p^2)} \quad (14)$$

$$u_{bemf2} = \frac{(B + pA)}{(1 - p^2)}$$

where $p = M/L$, A and B are given with the following formulas:

$$A = \frac{(I_{1f} - I_{1s}e^{-t_{tot1}/\tau})R(1 - p^2) + S_{1n}}{e^{-t_{tot1}/\tau} - 1}$$

$$B = \frac{(I_{2f} - I_{2s}e^{-t_{tot2}/\tau})R(1 - p^2) + S_{2m}}{e^{-t_{tot2}/\tau} - 1}$$

$S_{1n}$ and $S_{2m}$ are given with the following recursive formulas:

$S_{10} = 0$ $S_{1i} = S_{1i-1}e^{-t_{1i}/\tau} + (Ea_{1i} - pEa_{2i} - p^2RI_{1i} + pRI_{2i})(e^{-t_{1i}/\tau} - 1)$ $i = 1 \ldots n$ $S_{20} = 0$ $S_{2j} = S_{2j-1}e^{-t_{2j}/\tau} + (Ea'_{2j} - pEa'_{1j} - p^2RI'_{2j} + pRI'_{1j})(e^{-t_{2j}/\tau} - 1)$ $j = 1 \ldots m$ $I_{1s}$, $I_{2s}$ are the set values of the respective currents in the last from the said time intervals; $I_{1f}$, $I_{2f}$ are the set values of the respective currents in the last from the said time intervals; t1i and t2j are the durations of the said time intervals for the respective currents; $t_{tot1}$ and $t_{tot2}$ are the algebraic sums of all said time intervals for the respective currents; $a_{1i}$ and $a_{2i}$ are coefficients equal to 1 or 0 depending on whether the respective winding is connected to the supply source or is short-circuited during the said time intervals for the first current; a'1j and a'2j are coefficients equal to 1 or 0 depending on whether the respective winding is connected to the supply source or is short-circuited during the said time intervals for the second current; $I_{1i}$ and $I_{2i}$ are the set values of the respective currents during the said time intervals for first current; I'1j and I'2j are the set values of the respective currents during the said time intervals for the second current; n and m are the total number of the said time intervals for the first and the second current respectively; from the calculated values of the back-electromotive force voltages $u_{bemf1}$ and $u_{bemf2}$, instantaneous values of motor load angle $\theta$ and angular rotor speed $\omega$ are calculated based on the following formulas:

$$u_{bemf1} = U_m \cos\beta = k\omega \cos\beta$$

$$u_{bemf2} = U_m \sin\beta = k\omega \sin\beta$$

$$\theta = \alpha - \beta$$

where $U_m$ is the amplitude of $u_{bemf1}$ and $u_{bemf2}$, is a motor constant that is determined from the datasheet parameters of the motor, is $\beta$ is the angular position of the rotor with respect to the rotor zero position, $\alpha$ is the angular position of the vector of the stator magnetic field with respect to the rotor zero position; based on the calculated motor load angle $\theta$ and angular rotor speed $\omega$ a closed-loop control of the motor is executed.

* * * * *